United States Patent [19]
Allen

[11] 4,295,631
[45] Oct. 20, 1981

[54] SOLENOID OPERATED VALVE

[76] Inventor: Walter E. Allen, 9 Barry La., Prospect, Conn. 06511

[21] Appl. No.: 131,950

[22] Filed: Mar. 21, 1980

[51] Int. Cl.³ .............................................. F16K 31/02
[52] U.S. Cl. ...................................... 251/30; 92/102; 92/103 F; 251/45
[58] Field of Search ..................... 251/30, 45, 46, 141, 251/38, 61.1; 92/102, 103 F; 137/414, 484.2

[56] References Cited
U.S. PATENT DOCUMENTS

| | | | |
|---|---|---|---|
| 882,944 | 3/1908 | Haas | 251/46 |
| 1,614,468 | 1/1927 | Haas | 251/46 |
| 2,776,812 | 1/1957 | Colendar | 251/45 |
| 2,940,722 | 6/1960 | Vargo | 92/103 F |
| 3,079,952 | 3/1963 | Miller | 251/30 |
| 3,282,171 | 11/1966 | Tückmantel | 92/193 F |
| 3,362,679 | 1/1968 | Le Wan | 251/38 |
| 3,493,008 | 2/1970 | Scaglione | 251/46 |
| 3,895,645 | 7/1975 | Johnson | 137/414 |
| 3,943,975 | 3/1976 | Schnittker | 251/30 |
| 4,179,096 | 12/1979 | Fromfield | 251/45 |
| 4,192,345 | 3/1980 | Fujii et al. | 60/592 |
| 4,206,901 | 6/1980 | Williams | 251/35 |

Primary Examiner—Martin P. Schwadron
Assistant Examiner—G. L. Walton
Attorney, Agent, or Firm—Prutzman, Kalb, Chilton & Alix

[57] ABSTRACT

A solenoid operated valve with a primary diaphragm type valve member controlled in accordance with the fluid pressure on opposite sides thereof and a solenoid operated pilot valve having a fixed axially extending pilot valve outlet tube extending through a central opening in the diaphragm valve member and operable for selectively referencing the fluid pressure on one side of the diaphragm with the valve outlet pressure.

13 Claims, 2 Drawing Figures

SOLENOID OPERATED VALVE

TECHNICAL FIELD AND DISCLOSURE OF INVENTION

The present invention relates generally to solenoid operated valves and more particularly to a new and improved valve of the type having a solenoid operated pilot valve.

It is a principal aim of the present invention to provide a new and improved solenoid operated valve having a short stroke solenoid requiring less electrical energy and a smaller operating coil.

It is another aim of the present invention to provide in a solenoid operated valve a new and improved arrangement of primary and pilot valves which is smaller, more compact, lighter, and composed of fewer parts than conventional solenoid operated valves of the same flow capacity.

It is a further aim of the present invention to provide in a solenoid operated valve of the type described a new and improved coaxial arrangement of primary and solenoid operated pilot valves providing a low cost and compact valve assembly.

It is another aim of the present invention to provide a new and improved solenoid operated valve which can be economically manufactured on a mass production basis and out of a material selected for each type of application.

It is another aim of the present invention to provide a new and improved quick acting solenoid operated valve which is more reliable than conventional valves of comparable flow capacity.

Other objects will be in part obvious and in part pointed out more in detail hereinafter.

A better understanding of the invention will be obtained from the following detailed description and the accompanying drawing of an illustrative application of the invention.

BEST MODE FOR CARRYING OUT THE INVENTION

Figure 1:
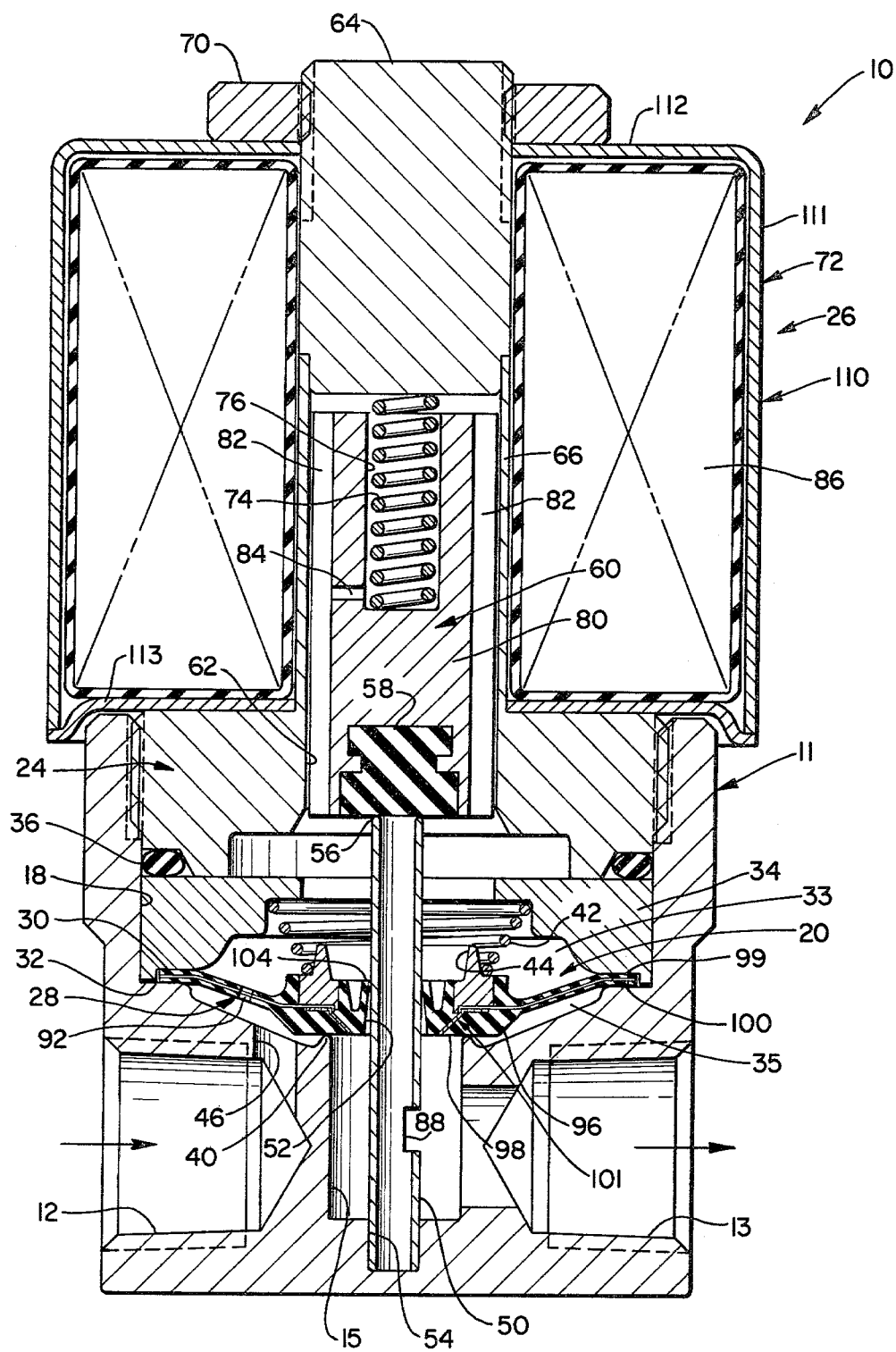
FIG. 1 is an axial section view, partly in section, of a solenoid operated valve incorporating an embodiment of the present invention.

Referring now to the drawings in detail, a solenoid operated valve 10 incorporating an embodiment of the present invention is shown having a generally cylindrical valve body 11 with a lower cylindrical section with diametrically opposed radial inlet and outlet bores 12, 13 and a central axial outlet bore 15 in communication with the radial outlet bore 13. An upper cylindrical section of the valve body having a slightly larger diameter than the lower cylindrical section, has a large bore 18 which provides an upper valve operating chamber 20 in communication with the lower coaxial outlet bore 15. The radial inlet and outlet bores 12, 13 are shown having internal pipe threads for connecting the valve body 11 to inlet and outlet conduits (not shown) in a conventional manner. Also, the upper large bore 18 is internally threaded for receiving a threaded plunger guide collar 24 of a solenoid subassembly 26.

A circular diaphragm 28 providing a primary valve member is coaxially mounted within the upper valve chamber 20 with its outer circular edge 30 secured between an upwardly facing support shoulder 32 of the valve body 11 and a retainer ring 34 secured between the support shoulder 32 and the plunger guide collar 24. The diaphragm 28 thereby divides the valve operating chamber 20 into separate upper and lower fluid chambers 33, 35. A peripheral ring seal 36 is mounted on a reduced inner end of the guide collar 24, and the guide coller 24 is adapted to be screwed inwardly into engagement with the diaphragm retainer ring 34 to secure the retainer 34 and diaphragm 28 in place and clamp the ring seal 36 between the guide collar 24 and retainer ring 34 for sealing the valve body bore 18 above the diaphragm 28.

The valve body 11 is formed with a circular rounded rib 40 at the inner or upper end of the lower coaxial outlet bore 15 to provide a primary valve seat for engagement by the diaphragm 28 as shown in the drawing. The diaphragm 28 is normally biased into engagement with its valve seat 40 by a coil compression spring 42 mounted between the diaphragm retainer 34 and an inner rigid coaxial ring 44 forming part of the diaphragm 28. The lower fluid chamber 35 below the diaphragm 28 is connected to the valve inlet 12 by an offset axial bore 46 and so that the diaphragm 28 is adapted to be opened by valve inlet pressure to connect the valve inlet 12 to the valve outlet 13 via the lower fluid chamber 35 and the lower coaxial outlet bore 15.

A pilot valve tube 50 of for example stainless steel or brass is coaxially mounted within the valve body 11 to extend through a central opening 52 in the diaphragm 28 and with its lower end suitably secured within a reduced coaxial bore 54 of the valve body 11. The tube 50 is formed with a rounded upper circular end 56 to provide a valve seat engageable by a suitable elastomeric insert 58 at the lower end of a linear pilot valve plunger 60 axially reciprocable within an axial bore 62 of the plunger guide collar 24. A generally cylindrical post or plug 64 is coaxially mounted on the upper end of an axially extending sleeve 66 of the guide collar 24. For that purpose, the plug 64 is formed with a reduced inner end which receives and is suitably secured to the upper end of the guide collar sleeve 66. The post 64 is externally threaded at its upper end for receiving a nut 70 for securing a solenoid coil subassembly 72 between the enlarged lower end of the guide collar 24 and the nut 70.

A suitable coil compression spring 74 is mounted within an upper axial bore 76 of the pilot valve plunger body 80 in engagement with the end post 64 for biasing the pilot valve plunger 60 downwardly into engagement with the valve seat 56 provided at the upper end of the pilot valve tube 50. The plunger body 80 is formed with peripheral axially extending slots 82 and with a radial bore 84 connecting the spring bore 76 with one of the slots 82 to permit the plunger 60 to reciprocate freely within the guide collar 24.

An annular solenoid coil 86 of the solenoid coil subassembly 72 provides, when energized, for withdrawing the pilot valve plunger 60 from its valve seat 56 against the bias of the plunger return spring 74. The upper fluid chamber 33 above the diaphragm 28 is thereupon connected to valve outlet pressure at the lower axial outlet bore 15 via the pilot valve outlet tube 50 and a radial tube outlet opening 88 aligned with the valve outlet bore 13. The fluid pressure within the upper fluid chamber 33 is then referenced via the tube 56 and outlet openings 88 to the downstream pressure at the valve outlet bore 13. Valve inlet pressure in the lower fluid chamber 33 on the underside of the diaphragm 28 is then effective to actuate the diaphragm 28 upwardly from its valve seat 40 against the bias of the diaphragm return spring 42 to open the primary valve.

Upon de-energizing the solenoid coil 86, the pilot valve plunger 60 is returned into engagement with its valve seat 56 by the plunger return spring 74. An orifice 92 in the diaphragm 28 is provided for equalizing the fluid pressure on both sides of the diaphragm 28 when the pilot valve is closed to permit the diaphragm return spring 42 to return the diaphragm 28 into engagement with its seat 40 and thereby close the primary valve. The size of the orifice 92 is related to the size of the outlet tube 50 so that the fluid pressure in the upper fluid chamber 33 is referenced to the valve outlet pressure at the outlet 13 when the pilot valve is opened and so that the diaphragm valve member 28 is then quickly opened by valve inlet pressure below the diaphragm.

Figure 2:
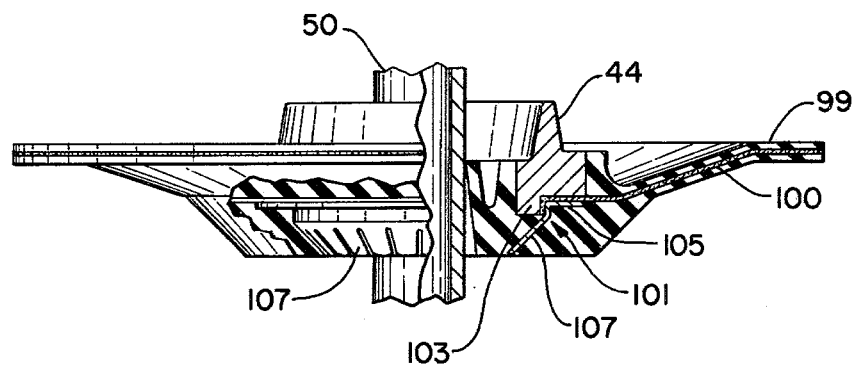
FIG. 2 is an enlarged partial axial section view, partly broken away and partly in section, of the solenoid operated valve, showing the details of construction of a diaphragm valve member of the valve.

The diaphragm 28 has a body 96 of suitable elastomeric material with a lower flat axial face 98 engageable with its valve seat 40. The elastomeric body 96 is formed with a flexible radial flange or thin wall 99 and is integrally molded to a suitable reinforcing web 100 which extends outwardly within the flexible wall 99 generally centrally between the opposed faces of the flexible wall 99. Also, the elastomeric body 96 is integrally molded to the spring ring 44 and to a lower sheet metal washer or retainer 101 which are preassembled with the reinforcing web 100 in a suitable diaphragm mold cavity (not shown) to center the web 100 within the mold and restrain the inner circular edge of the web 100 against diaplacement during the molding process. For that purpose, as seen in FIG. 2, the spring support ring 44 and washer 101 have opposed contiguous faces and an interfitting axial rib 103 and axial flange 105 respectively generally L-shaped rim 105 which interfit for clamping the inner circular edge of the web 100 therebetween. Also, the washer 101 has inner resilient fingers 107 extending downwardly and inwardly from its axial flange 105 to the lower axial face 98 of the diaphragm 28. The washer 101, spring support ring 44 and web 100 are preassembled within the diaphragm mold cavity (not shown) with the ring 44 and washer 101 resiliently held in position by the resilient fingers 107 to properly and firmly locate those parts during the molding process.

The spring support ring 44 and spring 42 help maintain the diaphragm 28 in coaxial association with the pilot valve tube 50 as the diaphragm shifts linearly between its open and closed positions. Also, the elastomeric body 96 of the diaphragm is formed with a truncated or partly conical, axially upwardly and inwardly tapering sleeve 104 which engages the outer cylindrical surface of the pilot valve tube 50 to provide a fluid seal between the diaphragm 28 and tube 50. When the diaphragm 28 is closed, the differential pressure above and below the diaphragm seal 104 holds the seal into engagement with the pilot valve tube 50. When the pilot valve is opened to generally equalize the pressure above and below the conical seal 104, the seal 104 is "released" to permit the primary valve to be opened quickly without significant tube resistance.

The solenoid coil subassembly 72 has an outer housing 110 with cylindrical and upper end walls 111, 112 and a lower circular housing washer 113 secured to the lower end of the cylindrical wall 111. The coil housing and the end post 64 form a ferro-magnetic circuit for withdrawing the pilot valve plunger 60 when the coil 86 is energized. The plunger body 80 is formed of a suitable ferro-magnetic material and the plunger guide collar 24 is preferably formed of a suitable non-ferromagnetic material such as non-magnetic stainless steel.

Only a short plunger stroke is provided or required as the stroke need only be sufficient to open the pilot valve adequately to relieve the pressure above the diaphragm 28. Thus, it can be seen that the pilot valve plunger stroke is completely independent of the diaphragm stroke and operation. With a short pilot valve stroke, the electrical energy and coil size required for opening the pilot valve is substantially reduced.

Also, it can be seen that the entire valve assembly 10 is composed of few parts which can be economically manufactured on a mass production basis. The valve body 11 can be manufactured by a screw machine on a mass production basis rather than by a forging or casting process, and therefore can be readily manufactured of the appropriate material for each fluid handling application.

Thus, the valve body 11 as well as the remaining metal parts in contact with the valve fluid can be manufactured for example of stainless steel or other material difficult to manufacture as a forging or casting.

As will be apparent to persons skilled in the art, various modifications, adaptations and variations of the foregoing specific disclosure can be made without departing from the teachings of the present invention.

I claim:

1. In a valve assembly having a primary valve and a solenoid operated pilot valve with respective linear primary and pilot valve members, each shiftable linearly between open and closed alternate operating positions thereof, the solenoid operated pilot valve being connected to the primary valve for operating the primary valve member to its said alternate operating positions upon operation of the pilot valve member to its said alternate operating positions respectively, the improvement wherein the primary valve member has an axial opening, and wherein the pilot valve comprises a fixed linear pilot valve tube mounted coaxially with and extending through the axial opening of the primary valve member and has an inner fluid passageway through the primary valve member to provide fluid communication between opposite axial sides of the primary valve member, the primary valve member having fluid sealing means around its said axial opening which remains in sealing engagement with the fixed linear pilot valve tube as the primary valve member shifts linearly between its open and closed operating positions, and the pilot valve member in its alternate operating positions being operable for selectively opening and closing the said inner fluid passageway of the pilot valve tube for selectively connecting the opposite axial sides of the primary valve member through the primary valve member for controlling the pressure drop across the primary valve member.

2. A valve assembly according to claim 1 wherein the pilot valve tube and primary and pilot valve members are coaxially mounted and the pilot valve tube has a coaxial open end providing a pilot valve seat engageable by the pilot valve member for closing the pilot valve tube.

3. A valve assembly according to claim 1 wherein the primary valve member is a diaphragm valve member.

4. A valve assembly according to claim 3 wherein the valve assembly comprises a valve body with a valve operating chamber receiving the diaphragm valve member, inlet and outlet conduits in communication with the valve operating chamber on one side of the diaphragm valve member and a valve seat coaxial with and selectively engageable by the diaphragm valve member to selectively close the outlet conduit.

5. A valve assembly according to claim 1, 2, 3 or 4 wherein the primary and pilot valves each have a return spring biasing the respective valve member to one of its said alternate positions.

6. A valve assembly according to claim 1, 2, 3 or 4 wherein the solenoid operated pilot valve comprises an annular solenoid coil coaxial with and surrounding the pilot valve member for magnetically actuating the pilot valve member in one axial direction to a said alternate operating position thereof.

7. A valve assembly according to claim 1, 2, 3 or 4 wherein the fluid sealing means of the primary valve member has a truncated conical sealing lip coaxial with the pilot valve tube for sealing engagement therewith.

8. A valve assembly according to claim 7 wherein the truncated conical sealing lip tapers inwardly in the axial direction toward said opposite side of the diaphragm for being biased into engagement with the pilot valve tube by fluid pressure on said opposite side of the diaphragm.

9. A solenoid operated valve assembly having a generally circular valve body with generally diametrically opposed radial inlet and outlet bores at one axial end thereof, a stepped axial bore with a first relatively small diameter bore section at said one axial end of the valve body in communication with said radial outlet bore and a second relatively large diameter bore section, in communication with said radial inlet bore, having an axial opening at the other axial end of the valve body, the valve body having a coaxial primary valve seat between the relatively large and small diameter bore sections, a primary valve member, having a central axial opening with a fluid seal therearound, mounted within the second bore section for being selectively axially shifted into and withdrawn from engagement with the primary valve seat for selectively closing and opening the first bore section respectively, a fixed linear pilot valve tube mounted coaxially within the stepped axial bore within the central axial opening of the primary valve member and engageable by its fluid seal, and having an inner fluid passageway through the primary valve member for connecting the first bore section with the opposite axial side of the primary valve member, the fluid seal of the primary valve member remaining in fluid sealing engagement with the fixed linear pilot valve tube as the primary valve member is axially shifted into and withdrawn from engagement with the primary valve seat, a plunger guide mounted within the second bore section having a coaxial plunger support sleeve in axial alignment with an end of the pilot valve tube, a linear plunger valve member axially reciprocable in the support sleeve into and out of sealing engagement with the end of the pilot valve tube for selectively opening and closing its said inner fluid passageway for selectively connecting said first bore section with the opposite axial side of the primary valve member through the primary valve member, a pilot valve closure spring axially biasing the plunger into engagement with the end of the pilot valve tube, and a solenoid coil surrounding the guide sleeve and adapted when energized for axially withdrawing the plunger out of engagement with the pilot guide tube against the bias of the closure spring, and an orifice connecting the valve inlet bore to the second bore section on said opposite axial side of the primary valve member, and a primary valve closure spring for shifting the primary valve member into engagement with the primary valve seat when the pilot valve is closed.

10. A solenoid operated valve assembly having a valve body with a stepped bore with a first relatively small diameter bore section at one axial end of the valve body and a second relatively large diameter bore section at the other axial end of the valve body, separate outlet and inlet bores at said one axial end of the valve body in communication with said first and second bore sections respectively, the valve body having a coaxial primary valve seat between said first and second bore sections, a primary valve member, having a central axial opening with a fluid seal therearound, mounted generally coaxially within said second bore section, the primary valve member dividing said second bore section into separate fluid chambers and being engageable with the primary valve seat for disconnecting the inlet and outlet bores and for being selectively axially withdrawn from the primary valve seat for connecting the inlet and outlet bores, a fixed linear pilot valve tube mounted coaxially within the stepped axial bore, within the central axial opening of the primary valve member and engageable by its fluid seal and having an inner fluid passageway through the primary valve member, for connecting the said first bore section with the fluid chamber on the opposite axial side of the primary valve member, the fluid seal of the primary valve member remaining in fluid sealing engagement with the fixed linear pilot valve tube as the primary valve member is axially shifted into and withdrawn from engagement with the primary valve seat, a linear pilot valve member axially reciprocable between open and closed positions thereof for selectively opening and closing the said inner fluid passageway of the pilot valve tube respectively for selectively connecting the said first bore section with the fluid chamber on the opposite axial side of the primary valve member through the primary valve member, a pilot valve operating spring axially biasing the pilot valve member to one of its said positions, a solenoid coil adapted when energized for axially shifting the pilot valve member against the bias of its operating spring to its other said position, an orifice interconnecting the fluid chambers, and a primary valve closure spring biasing the primary valve member into engagement with the primary valve seat for closing the primary valve when the pilot valve is closed.

11. A valve assembly according to claim 1, 9 or 10 wherein the primary valve member is a diaphragm type valve member having an outer generally radially extending thin wall diaphragm portion with a generally radially extending reinforcing web embedded therein and an inner enlarged central portion generally coaxial with and having said axial opening receiving the pilot valve tube and comprising a pair of coaxial annular members interfitting for clamping an inner annular section of the reinforcing web therebetween.

12. A valve assembly according to claim 11 wherein the annular members have opposed generally axially extending shoulders clamping the reinforcing web therebetween.

13. A valve assembly according to claim 11 wherein one of the annular members has an annular arrangement of a plurality of resilient fingers extending axially outwardly at an angle to the axis of the primary valve member.

* * * * *